No. 852,556. PATENTED MAY 7, 1907.
H. F. HALL.
EGG BOILER.
APPLICATION FILED MAR. 27, 1906.
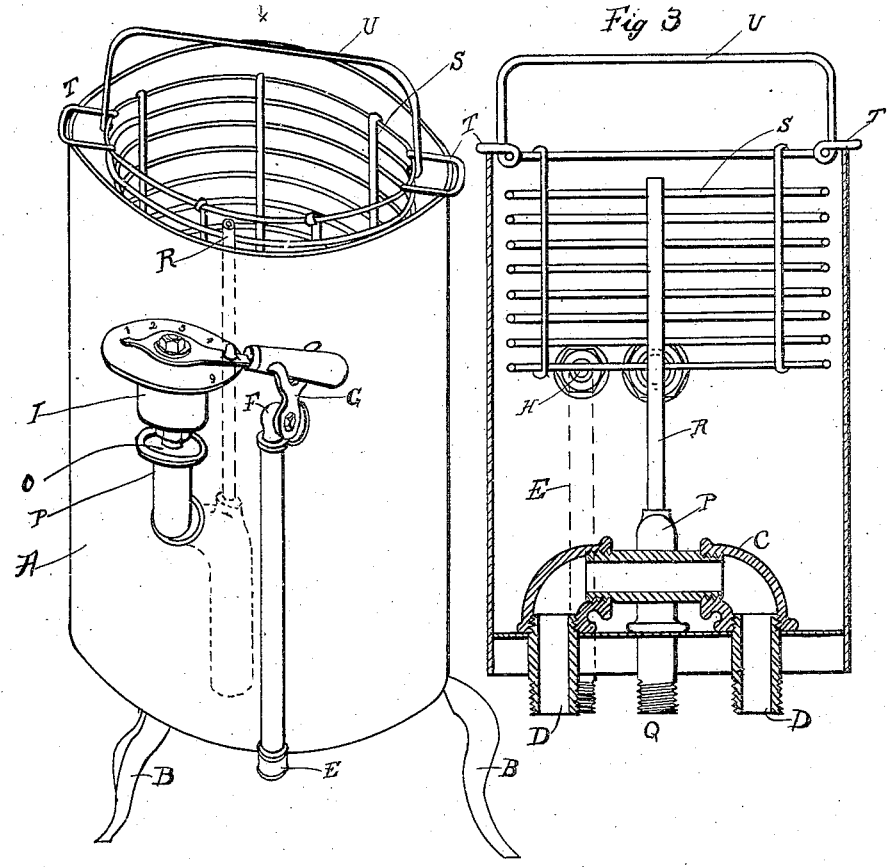

UNITED STATES PATENT OFFICE.

HARRY F. HALL, OF PHILADELPHIA, PENNSYLVANIA.

EGG-BOILER.

No. 852,556.  Specification of Letters Patent.  Patented May 7, 1907.

Application filed March 27, 1906. Serial No. 308,222.

*To all whom it may concern:*

Be it known that I, HARRY F. HALL, a citizen of the United States, residing at Philadelphia, county of Philadelphia, and State of Pennsylvania, have invented a certain new and useful Improvement in Egg-Boilers, of which the following is a specification.

My invention relates to a new and useful improvement in egg boilers, and has for its object to provide an exceedingly simple and effective apparatus of this description in which the length of time for boiling an egg may be predetermined, and when the limit of this time is reached the water will have fallen below the eggs, thus ceasing to cook the same.

A further object of my invention is to provide for filling the cooking tank to the proper level and for preventing the overflow thereof, and also for carrying away the waste water which flows from the timing valve while the eggs are being cooked.

With these ends in view, this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings forming a part of this specification, in which—

Figure 1 is a plan view of an apparatus made in accordance with my improvement. Fig. 2, a perspective, a portion of which is broken away to show the arrangement of the heating pipe. Fig. 3, a section at the line *x—x* of Fig. 1. Fig. 4, a detail section of the locking detent.

In carrying out my invention as here embodied I provide a small tank or reservoir A which is preferably mounted upon the legs B in order that it may conveniently be placed upon a lunch counter or back bar and connected with steam service. Within the bottom of this tank is located a heating pipe C, which may be of the shape here shown, or may be in the form of a coil, the ends of which pass through the bottom of the tank and are threaded as indicated at D, for convenience in coupling it to the steam service. This arrangement provides for the heating of the water contained within the tank.

A pipe E runs from the water supply and is connected with the valve F to which is secured the forked handle G for regulating the flow of water to the tank, the outlet from this valve leading to the interior of the tank, as indicated at H.

I represents the timing valve, which is connected to the tank about midway of its height, and the plug of this valve has secured thereto the lever J terminating in a pointer K adapted to travel over the dial L, which latter has indicated thereon the figures 1, 2, 3, 4, 5 and 6, or a greater number if desired, and the dial also has formed therein the depressions M with which the spring actuated detent N carried by the lever J is adapted to engage, thus indicating when the valve is set in alinement with one or another of the figures and holding the lever against accidental displacement. The outlet O of this valve is arranged immediately above the drain pipe P, which passes through the tank and terminates in a threaded end Q by which it may be connected with the drain of the building, and an overflow pipe R is connected to the drain pipe P on the inside of the tank and extends upward terminating at the proper point to determine the level of the water within said tank, so that should a surplus amount of water by accident be fed to the tank it will pass down the overflow pipe into the drain.

S represents the basket or holder made in the form of a wire cage adapted to be suspended in the tank by means of the brackets T projecting from the top thereof and resting upon the upper edge of the tank, and U is a suitable handle for lifting the holder from the tank when occasion requires.

The fork lever G of the valve F is so arranged relative to the lever J of the timing valve I that in swinging the last named lever so as to close the timing valve said lever will pass into the forked end of the lever G and operate this lever to open the valve F, thus permitting water to flow through the supply pipe E into the tank to raise the level of the water in the latter to the level of the upper end of the overflow pipe R. When the lever J is moved in the opposite direction to set the timing valve, the first effect thereof will be to so swing the lever G as to close the valve F which will remain closed so long as the eggs are cooking and until the timing valve has been shut off, as will be readily understood.

From this description the operation of my improvement will be obviously as follows: Eggs to be cooked are placed in the holder either while the latter is in the tank or before it has been so placed, when the timing valve I is set at the figure representing the time the eggs are to be cooked, and as this setting of the timing valve closes the supply valve and permits the gradual outflow of water from the tank, this outflowing water will pass through the valve to the drain pipe P at a rate which will require as many minutes as indicated by the pointer upon the dial for the level of the water to be lowered to the level of the valve, and as the valve communicates with the tank just below the level of the holder when the water reaches this point, the eggs will cease to cook, being entirely out of the water, but will remain reasonably hot by reason of the vapor rising from the water, so that should the attendant not be ready to remove the eggs at the time they should cease cooking they will remain sufficiently heated to be served, thus relieving the attendant of the necessity of close attention to the cooking. When the eggs just cooked have been removed and others placed in the holder, a fresh supply of water is admitted to the tank by the proper manipulation of the valve F and the process repeated.

Having thus fully described my invention, what I claim as new and useful, is—

The herein described combination of a tank, a supply pipe leading thereto, a valve controlling the flow of water through said supply pipe, a forked lever secured to said valve, a timing valve also connected with the tank, a lever for operating said timing valve, said last named lever adapted to engage with the forked end of the first named lever for operating the first named valve with the last named valve, as specified.

In testimony whereof, I have hereunto affixed my signature in the presence of two subscribing witnesses.

HARRY F. HALL.

Witnesses:
  MARY E. HAMER,
  S. M. GALLAGHER.